United States Patent
McKeague

(10) Patent No.: US 6,684,900 B1
(45) Date of Patent: Feb. 3, 2004

(54) INSTALLATION DEVICE FOR YARD HYDRANT

(75) Inventor: Daniel G. McKeague, Kirkwood, MO (US)

(73) Assignee: John C. Kupferle Foundry Company, St. Louis, MO (US)

( * ) Notice: Subject to any disclaimer, the term of this patent is extended or adjusted under 35 U.S.C. 154(b) by 0 days.

(21) Appl. No.: 10/235,311

(22) Filed: Sep. 5, 2002

(51) Int. Cl.$^7$ .............................. E03B 9/12; E03B 9/14; F16K 21/00

(52) U.S. Cl. ........................ 137/294; 137/296; 137/301; 137/315.01; 137/368

(58) Field of Search ................................ 137/272, 294, 137/296, 301, 368, 369, 315.01

(56) References Cited

U.S. PATENT DOCUMENTS

| | | | |
|---|---|---|---|
| 1,385,572 A | * | 7/1921 | Murdock .................. 137/301 |
| 2,649,111 A | | 8/1953 | Anderson |
| 2,649,768 A | | 8/1953 | Anderson |
| 2,730,326 A | | 1/1956 | Staben |
| 3,070,116 A | | 12/1962 | Noland et al. |
| 3,858,599 A | * | 1/1975 | Carlson .................... 137/307 |
| 4,372,339 A | | 2/1983 | Anderson |
| 5,115,833 A | | 5/1992 | Himle |
| 5,246,028 A | * | 9/1993 | Vandepas .................. 137/301 |
| 5,289,840 A | | 3/1994 | Anderson |
| 5,701,925 A | * | 12/1997 | Mulligan et al. ........... 137/302 |
| 6,116,265 A | | 9/2000 | Drake |
| 6,263,903 B1 | | 7/2001 | Sjoberg |

OTHER PUBLICATIONS

Murdock Manufacturing Supply Company, Flush Box Hydrant with Vacuum Breaker, cited by applicant via a fax on Nov. 5, 2003.*
Murdock Manufacturing Supply Company, "Genuine Murdock Street Washer Parts", Figure M–475 and Figure M–5100, cited by applicant via a fax on Nov. 5, 2003.*
Kupferle Foundry Company Models 903 and 909, catalog pp. 12A and 12B (no date; before Sep. 2001) (2 pages).
Woodford Mfg. Model Y34 (Form No. Y34.101, Rev. Dec. 1999) (2 pages).
Mansfield Plumbing Products YH–(Form No. 800, Aug. 2001) (2 pages).
Merrill Manufacturing Co., Any Flow (Form 2003.6, issued Aug. 1999) (4 pages).

* cited by examiner

Primary Examiner—George L. Walton
(74) Attorney, Agent, or Firm—Polster, Lieder, Woodruff & Lucchesi

(57) ABSTRACT

A device and method for installing yard hydrants which renders the yard hydrant easily installed and replaced. The device includes a buried adapter, a sleeve, and a cap. The buried adapter has an inlet for attachment to a buried water system pipe, an outlet for attachment to a valve body of a yard hydrant, a peripheral wall for attachment to a vertical sleeve, and a drain hole. The sleeve is preferably a pipe sized to receive the valve body of a yard hydrant. The cap illustratively includes an internally threaded collar screwed onto the top of the sleeve and two cover pieces locked to the collar against rotation, each cover piece having an upturned flange with semi-cylindrical recesses which clamp the standpipe of the yard hydrant between them. The device is attached to an underground water pipe, the yard hydrant is then inserted into the sleeve and removably screwed onto the adapter, and the cap is applied to lock the yard hydrant in place.

22 Claims, 3 Drawing Sheets

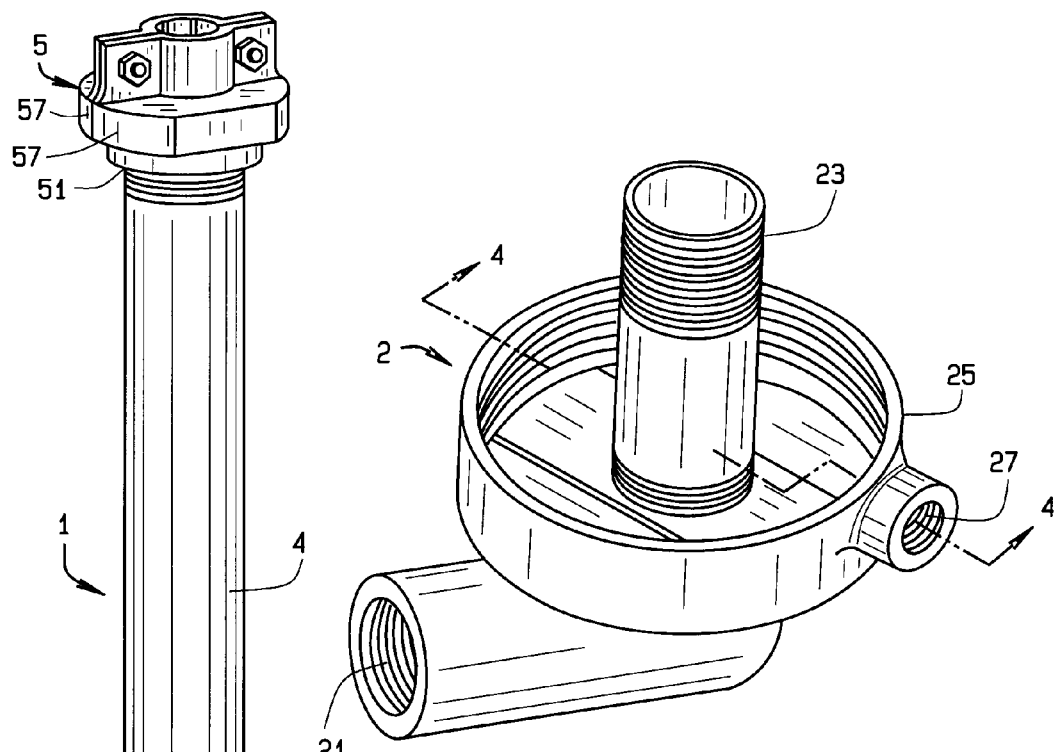
FIG. 3
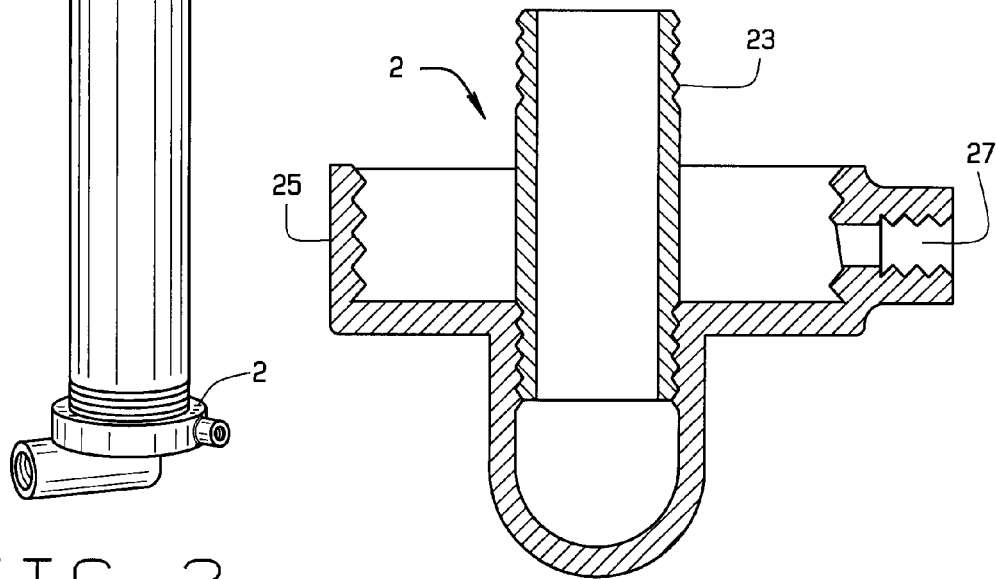
FIG. 2
FIG. 4

INSTALLATION DEVICE FOR YARD HYDRANT

CROSS-REFERENCE TO RELATED APPLICATIONS

Not Applicable.

STATEMENT REGARDING FEDERALLY SPONSORED RESEARCH

Not Applicable.

BACKGROUND OF THE INVENTION

This invention relates to yard hydrants, and in particular to a device for simplifying the replacement of yard hydrants.

Yard hydrants are freezeproof devices for supplying water to outdoor locations such as farmyards, suburban lawns, and gardens. They have been in widespread use for many decades, and their basic construction has not changed for over half a century. Typical examples are shown in Anderson, U.S. Pat. No. 2,649,111, Anderson, U.S. Pat. No. 2,649,768, Staben, U.S. Pat. No. 2,730,326, Noland et al., U.S. Pat. No. 3,070,116, Anderson, U.S. Pat. No. 4,372,339, and Anderson, U.S. Pat. No. 5,289,840. Commercial yard hydrants are widely available and include, for example, Kupferle Foundry Company Models 903 and 909, Woodford Mfg. Model Y34 (Form No. Y34.101, Rev. December 1999), Mansfield Plumbing Products YH-(Form No. 800, August 2001), and Merrill Manufacturing Co., Any Flow (Form 2003.6, issued August 1999). These patents and documents are incorporated herein by reference.

Yard hydrants typically have a self-draining valve body buried in the ground below the frost line, a generally vertical standpipe mounted to the valve body, and an actuator head at the top of the pipe above the ground. Water flows from the buried valve body through the standpipe, and through a spout in the head. A valve in the valve body is attached by a rod extending through the pipe to an actuator device, commonly a lever or a rotatable faucet handle, in the head. In the simplest form of a yard hydrant, the valve is a plunger and the valve body includes a threaded drain hole in a side wall. When the plunger is seated on the valve seat in closed position, the drain hole permits water to drain out of the pipe into the ground. When the valve is open, the plunger seals the drain hole.

Many styles of yard hydrants are in use. They typically include a cast lower valve body having a fitting for threading the lower valve body onto a water supply pipe. The supply pipe is usually an externally threaded 0.5" to 1.5" pipe, most commonly a 0.75" or 1" vertical pipe or nipple extending upwardly from a generally horizontal piping system. The cast lower valve body also includes a valve seat, a vertical by-pass passage for water to flow around the plunger when the plunger is raised from the valve seat, and an internally threaded fitting for threading the standpipe into the valve body.

The plunger is sized to expose the drain hole when the plunger seated on the valve seat, but to cover and seal it when the plunger is raised a short distance off the valve seat.

The standpipe is typically a 0.5" to 1.5" pipe, most commonly a 1" or 1.25" pipe, externally threaded at its ends. The standpipe may be from one foot long to over ten feet long, its length being dependent on the depth of the frostline and the height of the head above the ground.

The actuator rod or valve stem is frequently made in two pieces, connected by an adjustment collar.

The head of a yard hydrant is typically made of cast metal, having an internally threaded inlet fitting for the upper end of the standpipe, an outlet spout, and a water passage through the head body between the inlet and spout. The head also typically includes a packing through which the actuator rod extends to a connection to an external lever.

The actuator rod and plunger valve of a yard hydrant typically can be removed and replaced without digging up the yard hydrant, by unscrewing the head from the standpipe. If, however, the valve becomes stuck in the valve body, or if the actuator rod breaks deep within the standpipe, or if the valve seat is damaged, the yard hydrant must be dug up. The deeper the valve body is buried, the more cumbersome this job becomes. In some installations, such as when the yard hydrant standpipe has been encased in a concrete floor of a garden center, removing the yard hydrant for repair or replacement is almost impossible. Further, because yard hydrants are generally inexpensive, even the labor required for making repairs in the accessible internal parts may be more costly than the value of the hydrant.

BRIEF SUMMARY OF THE INVENTION

Briefly stated, the present invention provides a device and method for installing yard hydrants which renders the yard hydrant easily installed and replaced.

The device of the invention comprises a buried adapter, a sleeve, and a cap.

The buried adapter has an inlet for attachment to a buried water system pipe, an outlet for attachment to a valve body of a yard hydrant, a peripheral wall for attachment to a vertical sleeve, and a drain hole. The wall is preferably, but not necessarily, continuous and internally threaded. The drain is preferably threaded and is preferably toward the bottom of the peripheral wall. The inlet is preferably a female internally threaded fitting sized to thread onto the supply pipe. In the preferred embodiment, the inlet is substantially horizontal, to obviate the need for a vertical nipple on the supply pipe, although a vertical inlet centered in the body is also quite useable. The outlet is preferably a vertical externally threaded nipple centered with respect to the peripheral wall. In a preferred embodiment, the adapter is a casting having an internally threaded central opening into which the outlet nipple is threaded. The adapter forms one embodiment of the present invention.

The sleeve is preferably a pipe sized to receive the valve body of a yard hydrant. For a yard hydrant having a 1" standpipe, a 2.5" pipe is presently preferred. For a larger yard hydrant having a 1.25" standpipe, a 4" pipe may be needed. The sleeve is preferably externally threaded at its ends, to screw into the adapter and to provide an easy connection for the cap.

The cap functions to stabilize the upper end of the yard hydrant. It also may cover the top of the sleeve, for environmental protection, and may inhibit loosening or removing the sleeve or the yard hydrant. An illustrative form of the cap includes an internally threaded collar which is screwed onto the top of the sleeve. The collar includes an outwardly turned flange with flats at opposed sides. A split cover includes two cover pieces, each having an upturned flange with semi-cylindrical recesses which clamp the standpipe of the yard hydrant between them. Slight flats on the recesses provide a positive clamping force on the standpipe when the cover pieces are bolted together. Other cap designs are known in the art. The preferred cap also forms an embodiment of the present invention.

The method of the invention for installing a yard hydrant includes attaching the adapter to the water supply pipe, attaching the sleeve to the adapter, burying the adapter and sleeve, attaching the yard hydrant to the adapter, and attaching the cap to the standpipe of the yard hydrant. The method of removing the yard hydrant includes removing the cap from its clamping relationship to the standpipe, and then unscrewing and removing the standpipe and valve body from the adapter.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification:

FIG. 2 is a view in perspective of the mounting device of FIG. 1.

FIG. 3 is a view in perspective of an adapter part of the mounting device of FIG. 2.

FIG. 4 is a sectional view, taken along the line 3—3 of FIG. 3.

Corresponding reference numerals indicate corresponding parts throughout the several figures of the drawings.

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Figure 1:
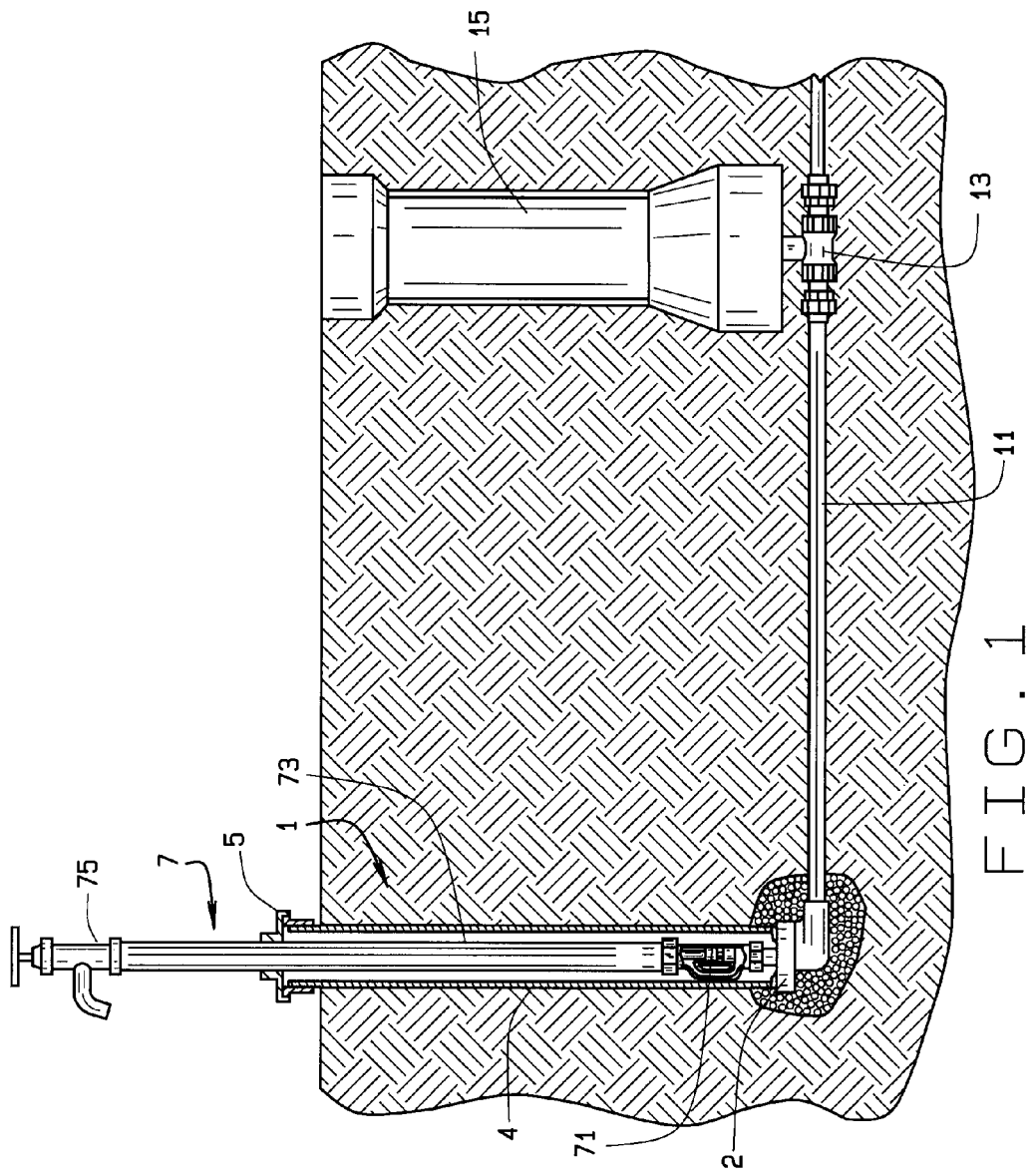
FIG. 1 is a view in side elevation, partially cut away, of a mounting device of the present invention installed in the ground with a yard hydrant mounted in it.
Figure 5:
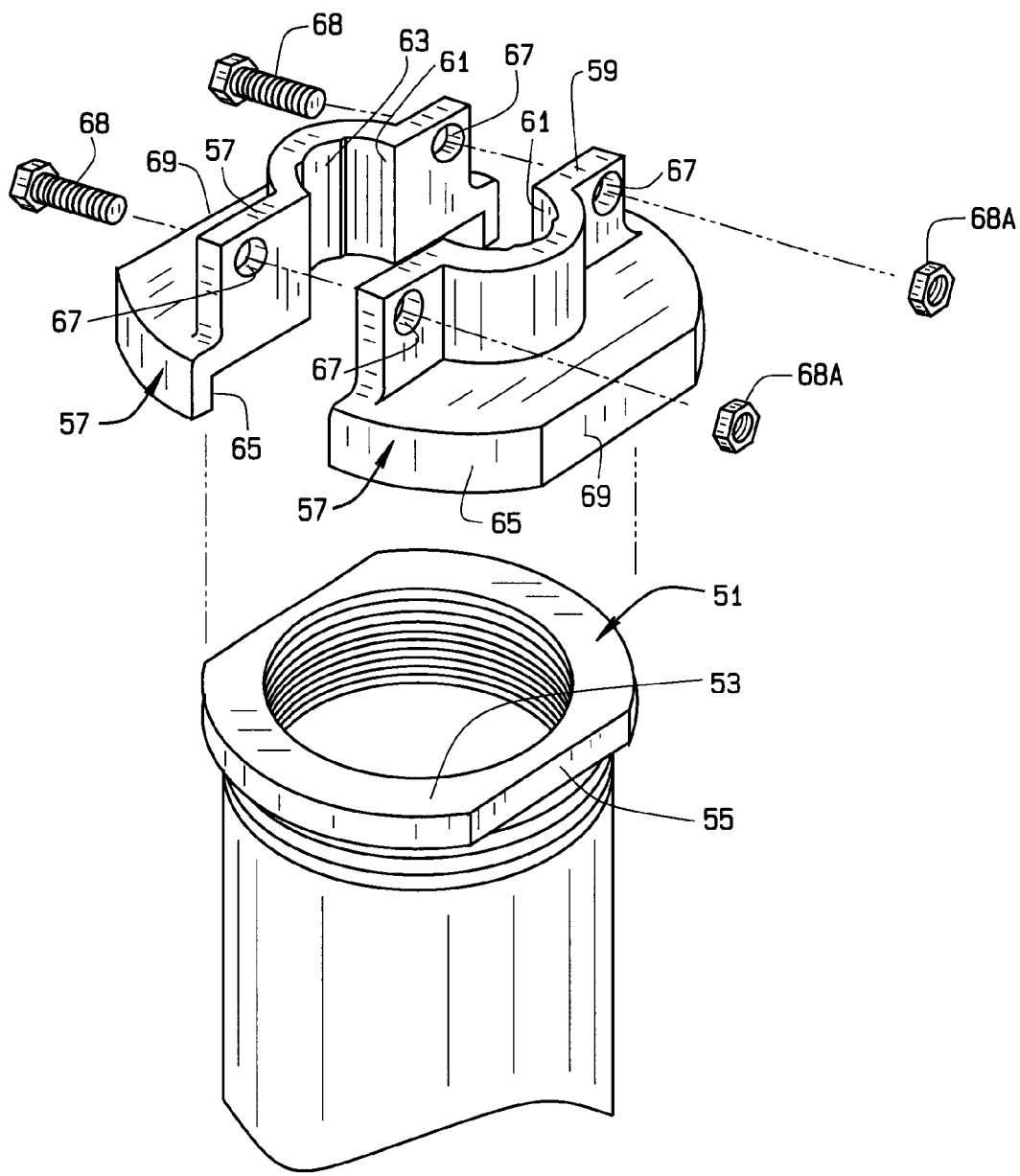
FIG. 5 is an exploded view of a cap part of FIG. 2.

As shown in FIG. 1, the yard hydrant installing device 1 of the invention comprises a buried adapter 2, a sleeve 4, and a cap 5. The device 1 is shown in its intended use, surrounding the lower portions of a yard hydrant 7. The adapter 2 is connected to an end of an underground water supply pipe 11, which is shown as including a conventional shutoff 13 accessible from above ground through a conventional valve box 15. The supply pipe 11 is conventionally buried below the freeze line for the locale.

The illustrative yard hydrant 7 is a Model No. 903 hydrant sold by The Kupferle Foundry Co. of St. Louis, Mo., USA. The hydrant 7 has a valve body 71 with a conventional valve seat, a drain hole, an inlet in its bottom wall, and an outlet at its top; a standpipe 73; a head 75 with a compression (faucet) handle and an outlet spout; and an internal mechanism, not shown, including a plunger valve and an operating rod extending from the plunger valve to the compression handle. Because the mounting device of the present invention operates independent of the internal structure and operation of the yard hydrant 7, the exact structure of the yard hydrant 7 (apart from the external dimensions of the valve body 71 and standpipe 73, and the existence of the drain hole) is not critical to the present invention.

As best seen in FIGS. 3 and 4, the buried adapter 2 has an inlet 21 for attachment to the buried water system pipe 11, an outlet 23 for attachment to an inlet at the lower end of valve body 71 of the yard hydrant 7, an upstanding peripheral wall 25 for attachment to the sleeve 4, and a drain opening 27. The wall 25 is internally threaded to accept external threads on the end of sleeve 4. The drain hole 27 is internally threaded and is located toward the bottom of the peripheral wall. The threads permit attachment of a drain tube, if it is desired to empty the yard hydrant to a remote location, of a check valve to prevent in-flow of contaminated water into the yard hydrant, or of a plug if the yard hydrant is to be used in a moderate climate where freezing is not a concern; if the drain 27 is plugged, the drain in the yard hydrant should also be plugged. The inlet 21 is illustratively an internally threaded fitting sized to thread onto external threads on the supply pipe 11. In the preferred embodiment, the inlet is substantially horizontal, to obviate the need for a conventional vertical nipple on the supply pipe, although a vertical inlet centered in the body is also quite useable. The outlet 23 is a vertical externally threaded pipe or nipple centered with respect to the peripheral wall 25. The adapter is formed from a brass casting having an internally threaded central opening into which the brass outlet nipple is threaded and chemically or mechanically locked.

The sleeve 4 is illustratively a "Schedule 40" galvanized pipe sized to receive the valve body of a yard hydrant. For the illustrative yard hydrant having a 1" standpipe, a 2.5" pipe is preferred. The sleeve is externally threaded at its ends, to screw into the adapter 2 and to provide an easy connection for the cap 5.

The illustrative cap 5 functions to stabilize the upper end of the yard hydrant. It also covers the top of the sleeve, for environmental protection, and inhibits loosening or removing the sleeve or the yard hydrant. The illustrative form of the cap 5 includes an internally threaded collar 51 which is screwed onto the top of the sleeve 4. The collar 51 includes an outwardly turned flange 53 with flats 55 at opposed sides. A split cover includes two identical cover pieces 57, each having an upturned flange 59 with a semi-cylindrical recess 61 having a flat 63. Each cover piece 57 also includes a peripheral downturned rim 65. The upturned flanges 59 include holes 67 through which bolts 68 are inserted and nuts 68A are tightened to lock the cover pieces to the standpipe 73 of the yard hydrant 7. The flats 63 on the recesses 61 provide a positive clamping force on the standpipe when the cover pieces 57 are bolted together. Flat portions 69 on the downturned rim 65 overlie the flats 55 and prevent the cover pieces 57 from turning relative to the collar 51. Because the collar 51 is fixed to the top of the sleeve 4 and the sleeve 4 is restrained from turning, the flats 55 and 63 prevent turning of the standpipe 73. The frictional grip of the cover pieces 57 on the standpipe 73 also prevents vertical motion of the cover pieces 57. The cap 5 thus provides a firm support for the standpipe 73 and relieves the valve body 71 and adapter 2 from flexural strains which would otherwise be caused by operation of the valve and forces placed on it by hoses and other attachments to the spout.

In use, a hole is dug to the depth of the horizontal supply pipe 11. It will be understood that on new construction a trench is likely already dug to place the supply pipe. The adapter 2 is threaded onto the end of the supply pipe, and the area around and under the adapter 2 is filled with crushed rock. A sleeve 4 of sufficient length to place its upper end just above ground level is chosen. The upper end of the sleeve 4 is threaded into the upper collar 51, optionally using a locking compound, and threaded into the peripheral wall 25 of the adapter 2, optionally using a locking compound to insure that the sleeve does not become loose with time. It will be understood that these steps may be carried out in other sequences, depending on the circumstances. For example, the mounting device 1 may be shipped and installed assembled except for the cover pieces 57, and the assembled device attached to the pipe 11 with a standard pipe union. The adapter and sleeve are then buried and the earth around them is compacted.

The hydrant inlet is coated with a suitable sealant that does not prevent unscrewing the hydrant from the adapter at a later date. The hydrant is then slid down the sleeve and screwed onto the outlet nipple 23. The two cover pieces 57 are then placed over the collar 51 and bolted together to lock the portion of the standpipe 73 extending through them in a fixed relationship to the upper end of the sleeve 4. This provides a stable mounting for the yard hydrant, which is no longer supported by dirt or other solid matrix around it.

Should it ever be desirable to replace the yard hydrant, the cap is removed or loosened by loosening cover pieces 57, the hydrant is rotated to remove it from the adapter 2, and the entire hydrant is lifted out without digging.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense. Merely by way of illustration, the inlet of the adapter may be vertical and may be centered in the adapter. The cap may be an open spider, or may be include parts which are pivoted, or otherwise permanently attached to the sleeve. Numerous other draining yard hydrants may be utilized. The drain or drains for the installation device may be formed differently or may be located in other places. A check valve may be installed in the threaded outlet 27 to prevent backflow into the adapter, and therefore into the yard hydrant. The sizes and materials of the parts may varied. These variations are merely illustrative.

What is claimed is:

1. An adapter for use in installing a yard hydrant in the ground so as to render the hydrant removable without digging, the adapter comprising a body having a threaded inlet sized to be attached to a buried water pipe; an externally threaded outlet in fluid communication with the threaded inlet, the externally threaded outlet being sized to removably accept an internally threaded inlet of a yard hydrant; a peripheral wall around the outlet, the outlet forming a center of the peripheral wall; threads on the peripheral wall, the threads being sized for mounting a sleeve to the peripheral wall, the sleeve having a diameter sized to accommodate the yard hydrant therein; and a drain opening through the adapter body.

2. The adapter of claim 1 wherein the threaded inlet is substantially horizontal and the threaded outlet is substantially vertical.

3. The adapter of claim 1 wherein the threaded inlet is below the peripheral wall.

4. The adapter of claim 1 wherein the peripheral wall is upstanding from a base, the peripheral wall being internally threaded.

5. The adapter of claim 4 wherein the peripheral wall is substantially uninterrupted.

6. The adapter of claim 4 wherein the drain opening is threaded and extends through the peripheral wall at a lower portion thereof.

7. The adapter of claim 1 wherein the outlet comprises a pipe nipple, the remainder of the adapter being formed as a single piece.

8. The adapter of claim 7 wherein the pipe nipple is externally threaded at both its ends, the nipple being threaded into the single piece.

9. The adapter of claim 8 wherein the single piece is a casting.

10. A mounting device for installing a yard hydrant to render the yard hydrant easily installed and replaced intact, the device comprising a buriable adapter having an inlet sized for attachment to a buried water system pipe, an externally threaded outlet sized for removably attaching to an internally threaded inlet at a lower end of a yard hydrant, a peripheral wall, and a drain hole;

a vertical sleeve attached to the peripheral wall, the sleeve having a diameter sized to surround the yard hydrant; and a cap at an upper end of the sleeve, the cap including a part sized to extend between the sleeve and a standpipe portion of the yard hydrant mounted in the device to stabilize the yard hydrant with respect to the sleeve.

11. The mounting device of claim 10 wherein the sleeve has a height sized to extend from a buried depth of the adapter to at least ground surface.

12. The mounting device of claim 10 wherein the sleeve is a pipe having external threads at its lower end, the peripheral wall of the adapter being an upstanding wall having internal threads.

13. The mounting device of claim 10 wherein the sleeve is a 2.5" pipe.

14. The mounting device of claim 10 wherein the cap is mounted on an upper end of the sleeve, the cap including structure defining an opening sized for passage of a standpipe of a yard hydrant.

15. The mounting device of claim 14 wherein the cap is formed in three parts:

an internally threaded collar attached to the top of the sleeve; and a two-piece split cover, each piece having an upturned flange with a semi-cylindrical recess in it, the recesses being sized to clamp a standpipe of a yard hydrant between them.

16. The mounting device of claim 15 wherein the recesses include flats sized to provide a positive clamping force on the standpipe when the cover pieces are bolted together.

17. The mounting device of claim 10 wherein the adapter wall is upstanding and internally threaded.

18. In combination a mounting device for installing a yard hydrant to render the yard hydrant easily installed and replaced, the device comprising a buried adapter having an inlet attached to a buried water system pipe and an externally threaded outlet, and a vertical sleeve attached to the adapter, the mounting device including a drain opening in an external wall thereof positioned to drain water in said mounting device; and a yard hydrant having an internally threaded inlet, an outlet, a valve and a valve seat between the inlet and the outlet, a standpipe, and a drain hole for draining water from the standpipe when the valve engages the valve seat, the inlet of the yard hydrant being removably attached to the outlet of the adapter, the standpipe extending through the sleeve, and a head part attached to an upper end of the standpipe.

19. The combination of claim 18 further including a check valve in the drain opening of the mounting device.

20. The combination of claim 18 wherein the mounting device includes a cap mounted on an upper end of the sleeve, the cap including structure defining an opening sized for passage of the standpipe of the yard hydrant.

21. The combination of claim 18 wherein the sleeve has a height sized to extend from a buried depth of the adapted to at least ground surface, the sleeve having an upper end below the head part of the yard hydrant.

22. The combination of claim 18 wherein the drain opening is in the adapter.

* * * * *